(12) United States Patent
Ohno (10) Patent No.: US 6,950,386 B2
(45) Date of Patent: Sep. 27, 2005

(54) OPTICAL RECORDING MEDIUM AND RECORDING METHOD ONTO THE OPTICAL RECORDING MEDIUM

(75) Inventor: Hirotoshi Ohno, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 353 days.

(21) Appl. No.: 10/368,471

(22) Filed: Feb. 20, 2003

(65) Prior Publication Data

US 2003/0161248 A1 Aug. 28, 2003

(30) Foreign Application Priority Data

Feb. 22, 2002 (JP) ..................................... P2002-046392

(51) Int. Cl.⁷ ................................................ G11B 7/00
(52) U.S. Cl. ............................... 369/275.4; 369/275.1; 369/47.1; 369/53.1; 369/59.1
(58) Field of Search ......................... 369/275.1, 275.2, 369/275.3, 275.4, 272, 47.1, 47.22, 53.1, 53.2, 53.41, 59.1, 59.25

(56) References Cited

U.S. PATENT DOCUMENTS

| 4,866,687 A | * | 9/1989 | Kasai et al. | 369/44.11 |
| 5,871,881 A | * | 2/1999 | Nishida et al. | 369/284 |
| 6,504,814 B2 | * | 1/2003 | Kuroda et al. | 369/275.3 |
| 6,829,212 B1 | * | 12/2004 | Morita et al. | 369/275.4 |

FOREIGN PATENT DOCUMENTS

| JP | 07-093810 | 4/1995 |
| JP | 08-124219 | 5/1996 |

* cited by examiner

Primary Examiner—Muhammad Edun
(74) Attorney, Agent, or Firm—Nath & Associates PLLC; Gary M. Nath; Gregory B. Kang (57) ABSTRACT

There is disclosed an optical recording medium comprising: a transparent resin substrate on which a groove and a land between the grooves disposed adjacent to each other are formed beforehand, wherein recording position information indicating a recording position with respect to an information signal is recorded beforehand on at least one of the groove and land, and a metal reflective film and protective film are successively formed on the groove and land.

8 Claims, 7 Drawing Sheets

X-X LONGITUDINAL SECTIONAL VIEW

X-X LONGITUDINAL
SECTIONAL VIEW

FIG.8A

FIG.8B

OPTICAL RECORDING MEDIUM AND RECORDING METHOD ONTO THE OPTICAL RECORDING MEDIUM

BACKGROUND OF THE INVENTION

1. Technical Field of the Invention

The present invention relates to optical recording media such as a disc-shaped optical disk and rectangular optical card in which an information signal can additionally be recorded by heat of a laser beam only once, and a recording method onto the optical recording medium.

2. Description of the Related Art

Optical recording media such as a disc-shaped optical disk and rectangular optical card have been frequently used, because various information such as video information, sound information, and computer data can be recorded in large capacities and desired information can be accessed at a high speed.

This type of optical recording medium can roughly be classified into a ROM type and an additionally recordable type.

For the above-described optical recording medium of the ROM type, an injection molder is used to convert an information signal to be recorded into a pit string including a plurality of pits on a transparent resin substrate, and a reflective film and protective film are successively formed on a surface in which the pit string is carved, for example, as a spiral track to form the medium. Moreover, a transparent resin substrate side is irradiated with a laser beam for reproduction from an optical pickup disposed so as to be movable in an optical recording medium drive, and the information signal is reproduced with a return light of the laser beam from the reflective film by the pit string.

On the other hand, for the optical recording medium of the additionally recordable type, the injection molder is used to form, for example, a groove having a predetermined depth, which is a recording track, in a spiral shape in the transparent resin substrate, and a recording film, reflective film, and protective film are successively formed on the surface including the groove. Moreover, the transparent resin substrate side is irradiated with the laser beam for recording from the optical pickup disposed so as to be movable in the optical recording medium drive, and the information signal to be recorded is recorded in the groove on the recording film. After the recording, in the same manner as in the ROM type, the transparent resin substrate side is irradiated with the laser beam for reproduction, and the information signal is reproduced with the return light of the laser beam from the reflective film by a light reflectance change.

Additionally, the optical recording medium of the ROM type can inexpensively be obtained by mass production. However, from a manufacturing aspect, it is difficult to record information which differs with each medium, such as unique ID information, on the medium of the ROM type. In a more concrete example, with respect to information (software) recorded in a compact disc-read only memory (CD-ROM) which is well known as the ROM type, there has been a demand for the recording of individual information such as ID information for each CD-ROM.

When there is such demand, the following "first to third methods" can be applied.

[First Method]

A first method comprises: using the optical recording media of the additionally recordable type which can inexpensively be obtained, such as a compact disc-recordable (CD-R) in which the information signal can be written only once, and a compact disc-rewritable (CD-RW) in which the signal can be written a plurality of times, to record the unique ID information in each medium.

Figure 1A:
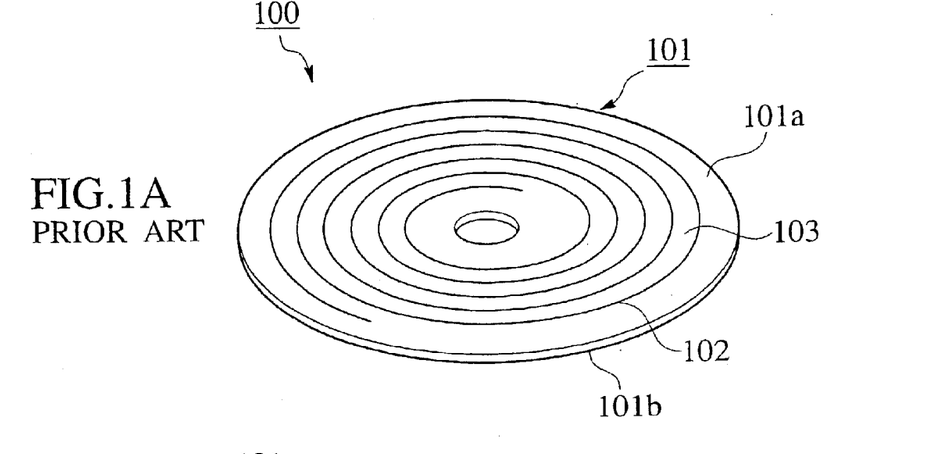
FIGS. 1A to 1C are an appearance perspective view, partial enlarged plan view, and longitudinal sectional view showing a well-known CD-R which is an optical recording medium of an additionally recordable type.
Figure 1B:
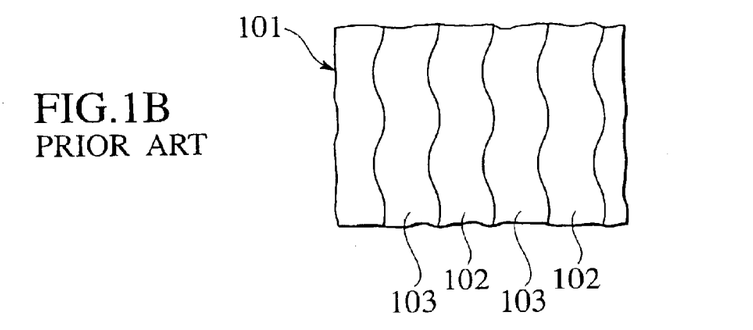
Figure 1C:
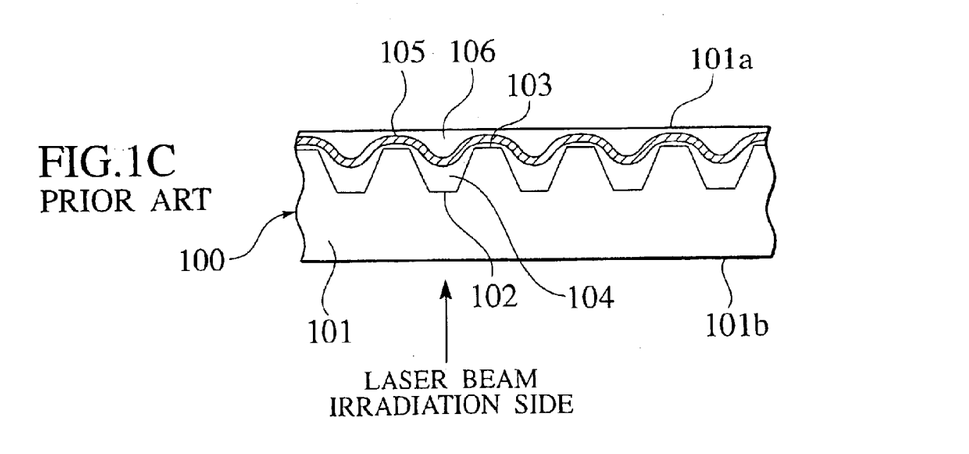

FIGS. 1A to 1C are an appearance perspective view, partial enlarged plan view, and longitudinal sectional view showing a well-known CD-R which is the optical recording medium of the additionally recordable type.

As shown in FIGS. 1A to 1C, in a conventional CD-R 100, transparent resin materials such as polycarbonate are used to mold a disc-shaped transparent resin substrate 101 which has an outer diameter of 120 mm, center hole diameter of 15 mm, and thickness of 1.2 mm. In this case, on one surface 101a side, a wobbled groove 102 is formed beforehand in a spiral shape toward an outer periphery from an inner periphery with substantially predetermined depth and pitch, and a land 103 is formed beforehand between the grooves 102, 102 formed adjacent to each other.

In this case, the groove 102 is wobbled as a guide track for additionally recording the information in a sinusoidal wave form on left and right sides of the groove by a wobble signal which has a center frequency of about 22 KHz. Moreover, an absolute time in pregroove (ATIP) signal is superimposed as recording position information indicating a recording position of the information signal upon the wobble signal, and thereby the recording position information is recorded beforehand in the groove 102. Concretely, FM modulation is applied about ±1 KHz centering on the wobble signal center frequency of about 22 KHz to superimpose the ATIP signal.

Furthermore, after the groove 102 and land 103 are formed on one surface 101a of the transparent resin substrate 101, the groove 102 and land 103 are coated with a recording film 104 of an organic dyestuff in a spin coat method. A metal reflective film 105 of aluminum, silver, or gold, and a protective film 106 of an ultraviolet curing resin are successively formed on the recording film 104.

When the CD-R 100 including the recording film 104 as described above is used, the wobbled groove 102 is irradiated with the laser beam for the recording from the optical pickup disposed so as to be movable in a CD-R drive (not shown) on a side of another surface 101b of the transparent resin substrate 101. The ATIP signal is extracted from the wobble signal by the groove 102, and the information to be recorded, which is converted into an EFM signal, is recorded as a reflectance change at a heat melting time of the organic dyestuff by the laser beam at a recording position on the groove 102 according to the ATIP signal. Therefore, the information signal can additionally be recorded only once in the groove 102 on the recording film 104. In this case, by only one additional recording, important ID information unique to the medium, which must not be permitted to be rewritten by alternation, can be recorded. However, for example, the recording of a large number of CD-R 100 exceeding 100 thousand discs by the CD-R drive raises a problem in a recording time and recording apparatus.

[Second Method]

A second method comprises: using a technical idea of optical recording medium disclosed in Japanese Patent Application Laid-Open No.8-124219 to irradiate the optical recording medium of the ROM type with an intense laser beam and to partially deform the transparent resin substrate so that the individual identification information is additionally recorded.

Figure 2:
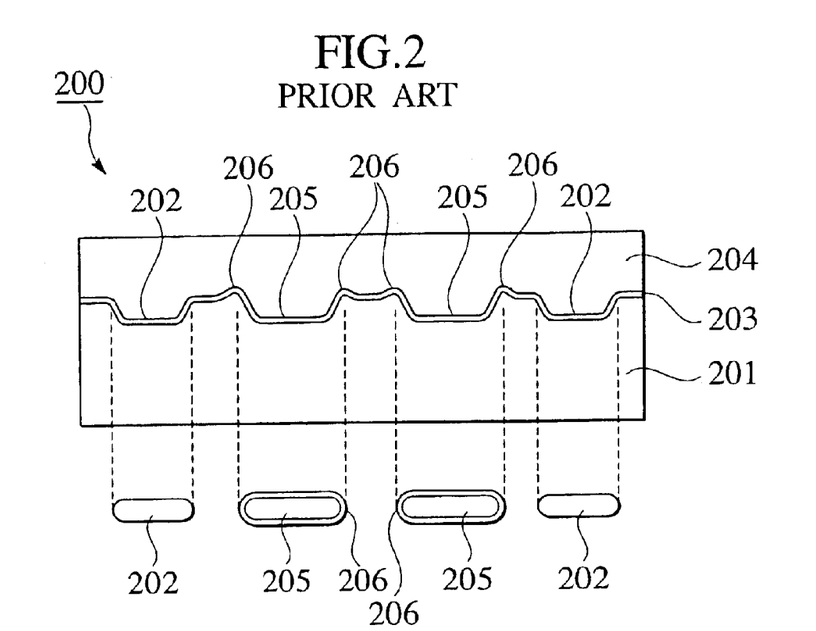
FIG. 2 is a longitudinal sectional view showing the optical recording medium of a ROM type in which a transparent resin substrate is irradiated with an intense laser beam and can partially be deformed according to a related art.

FIG. 2 is a longitudinal sectional view showing the optical recording medium of the ROM type as a related art in which the transparent resin substrate is irradiated with the intense laser beam and can partially be deformed.

As shown in FIG. 2, in an optical recording medium (CD-ROM) 200 of the ROM type, a plurality of pits 202 are carved in concave shapes on a transparent resin substrate 201 by injection molding by a stamper. A metal reflective film 203 of aluminum or gold, and a protective film 204 by the UV curable resin are successively formed on the pits 202.

Moreover, after the transparent resin substrate 201 is injection-molded, the metal reflective film 203 is irradiated with the intense laser beam of about 20 mW/$\mu$m$^2$. Then, the pits 202 are deformed like pits 205 by heat energy absorbed by the metal reflective film 203 to form rims 206 around the pits 205, and thereby mixed presence of the non-deformed pits 202 and deformed pits 205 can realize additional recording of individual key information.

Furthermore, as omitted from the drawing, there is also disclosed a method comprising: collapsing a part of the pit string of the pits 202 by the heat of the intense laser beam; and additionally recording the individual key information on the collapsed portions.

Additionally, as omitted from the drawing, there is also disclosed a method comprising: disposing a portion of about 1 mm in which the pits 202 are not formed in a part of the pit string constituting the track; irradiating the portion with the intense laser beam; and thermally deforming the transparent resin substrate 201 with the heat energy to additionally record the individual key information.

However, the injection-molded optical recording medium 200 has eccentricity and surface deflection. Therefore, unless recording position information obtained from recorded pit information is servo-laser recorded, it is impossible to physically deform the specified portion on the transparent resin substrate 201. In the above-described publication, a method of specifying the specified portion in additionally recording the individual key information on the transparent resin substrate 201, and a method of performing the servo additional recording are not disclosed.

[Third Method]

A third method comprises: using the technical idea of an optical disk disclosed in Japanese Patent Application Laid-Open No.7-93810 to irradiate the optical disk of the additionally recordable type with the intense laser beam and to make a hole in the reflective film.

Figure 3:
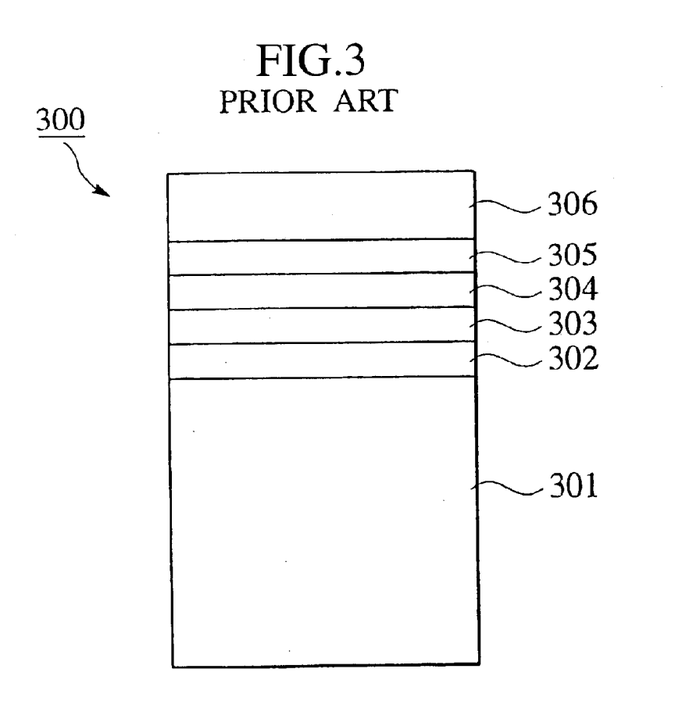
FIG. 3 is a longitudinal sectional view showing the optical disk of the additionally recordable type which can be irradiated with the intense laser beam to make a hole in a reflective film according to the related art.

FIG. 3 is a longitudinal sectional view showing the optical disk of the additionally recordable type as a related art which can be irradiated with the intense laser beam to make the hole in the reflective film.

As shown in FIG. 3, in an optical disk 300 of the additionally recordable type, on a substrate 301 formed of glass or plastic, an amorphous thin film 302 of As—S—Te or Ge—Sb—Te, a metal thin film 303 of Ag or Al, a buffer film 304 of SiO or ZnS, a reflective film 305 of Ag, and a protective film 306 of plastic are successively formed.

Moreover, when a substrate 301 side is irradiated with an irradiation light amount P1, temperature of the amorphous thin film 302 rises at T1° C., but the metal is not rapidly diffused in the amorphous thin film 302. It is also disclosed that the reflectance seen from the substrate 301 side does not change.

Furthermore, it is disclosed that the substrate 301 side is irradiated with an irradiation light amount P2, then the temperature of the amorphous thin film 302 rises at T2° C., the metal is rapidly diffused in the amorphous thin film 302, therefore the reflectance of a portion with the metal diffused therein becomes lower than that of an original laminated film, and transmittance increases to about 90%.

Additionally, it is disclosed that the substrate 301 side is irradiated with an irradiation light amount P3, then the temperature of the amorphous thin film 302 rises at T3° C., the amorphous thin film 302, metal thin film 303, buffer film 304, and reflective film 305 are molten, each film is pulled toward the periphery by surface tension to thereby make a hole in each film, and the reflectance seen from the substrate 301 side decreases to about 5%.

In the related art of the above-described publication, in the media in which the information can be rewritten, a method is disclosed comprising: changing the reflectance of the reflective film 305 at pit and non-pit portions in order to prevent once recorded data from being deleted or altered.

However, in the related art, a recording method onto a non-recorded portion in which there is not any pit is not disclosed.

SUMMARY OF THE INVENTION

To solve the problem, an object of the present invention is to provide an optical recording medium including a simple structure in which recording position information recorded beforehand in the optical recording medium is detected and an information signal can additionally be recorded only once at a recording position corresponding to the recording position information, and a recording method onto the optical recording medium.

To achieve the above-described object, there is provided an optical recording medium comprising: a transparent resin substrate on which a groove and a land between the grooves adjacent to each other are formed beforehand, wherein recording position information indicating a recording position of an information signal is recorded beforehand on at least one of the groove and land, and a metal reflective film and protective film are successively formed on the groove and land.

Moreover, to achieve the object, there is provided an optical recording medium comprising: a transparent resin substrate on which a pit string including a plurality of pits, a groove, and a land between the grooves adjacent to each other are formed beforehand, wherein recording position information indicating a recording position of an information signal is recorded beforehand on at least one of the groove and land, and a metal reflective film and protective film are successively formed on the pit string, groove, and land.

Furthermore, to achieve the object, there is provided a recording method onto an optical recording medium, for additionally recording an information signal on the optical recording medium as described above, the method comprising the steps of: detecting a recording position information signal corresponding to recording position information from the optical recording medium; melting a metal reflective film formed on at least one of the groove and land by heat of a laser beam; and additionally recording the information signal at a recording position corresponding to the recording position information.

Additionally, to achieve the object, there is provided a recording method onto an optical recording medium, for additionally recording an information signal on the optical recording medium as described above, the method comprising the steps of: detecting a recording position information signal corresponding to recording position information from the optical recording medium; changing reflectance of a metal reflective film formed on at least one of a groove and land by heat of a laser beam; and additionally recording the information signal at a recording position corresponding to the recording position information.

Moreover, to achieve the object, there is provided a recording method onto an optical recording medium, for additionally recording an information signal on the optical recording medium as described above, the method comprising the steps of: detecting a recording position information signal corresponding to recording position information from the optical recording medium; changing a shape of at least one of a groove and land by heat of a laser beam; and additionally recording the information signal at a recording position corresponding to the recording position information.

The nature, principle and utility of the invention will become more apparent from the following detailed description when read in conjunction with the accompanying drawings.

BRIEF DESCRIPTION OF THE DRAWINGS

In the accompanying drawings:

FIGS. 8A and 8B are explanatory views of the optical recording medium according to a second embodiment of the present invention.

DESCRIPTION OF THE PREFERRED EMBODIMENTS

Embodiments of an optical recording medium and a recording method onto the optical recording medium according to the present invention will be described hereinafter with reference to FIGS. 4A to 8B in order of <First Embodiment> and <Second Embodiment> in detail.

<First Embodiment>

For the optical recording medium and the recording method onto the optical recording medium according to a first embodiment of the present invention, in the optical recording medium comprising: a transparent resin substrate on which a wobbled groove and a land between the grooves adjacent to each other are formed beforehand, recording position information indicating a recording position of an information signal is recorded beforehand on the groove and/or the land, and a metal reflective film and protective film are successively formed on the groove and land. In this state, the method comprises: melting the metal reflective film on the groove and/or the land, changing reflectance of the reflective film, or changing a shape of the groove and/or the land by heat of a laser beam; and collecting heat so that the information signal can be recorded only once.

Figure 4A:
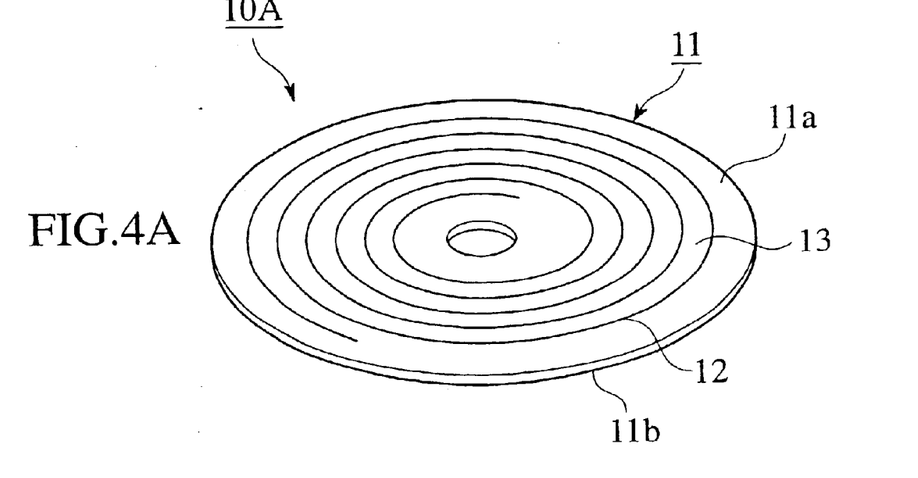
FIGS. 4A to 4C are an appearance perspective view, partial enlarged plan view, and longitudinal sectional view showing an optical recording medium according to a first embodiment of the present invention.
Figure 4B:
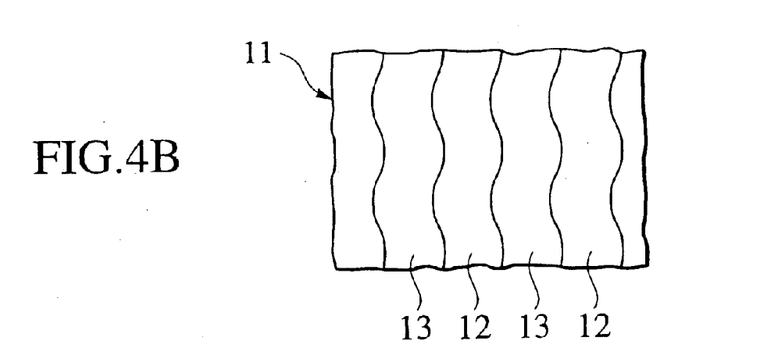
Figure 4C:
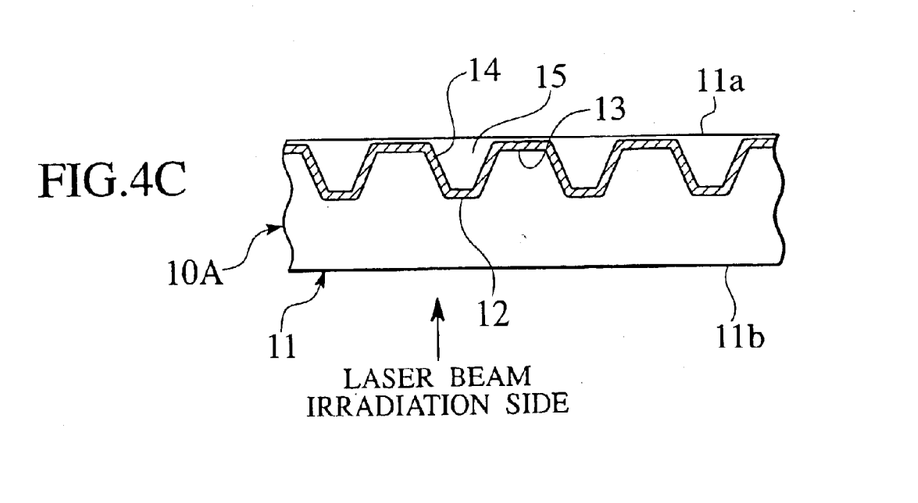

FIGS. 4A to 4C are an appearance perspective view, partial enlarged plan view, and sectional view showing the optical recording medium according to the first embodiment of the present invention.

As shown in FIGS. 4A to 4C, in an optical recording medium 10A according to the first embodiment of the present invention, transparent resin materials such as polycarbonate are used to mold a disc-shaped transparent resin substrate 11 which has an outer diameter of 120 mm, center hole diameter of 15 mm, and thickness of 1.2 mm. In this case, on a side of one surface 11a, a wobbled groove 12 is formed beforehand in a spiral shape toward an outer periphery from an inner periphery with substantially predetermined depth and pitch, and a land 13 is formed beforehand between the grooves 12, 12 formed adjacent to each other.

In this case, the groove 12 has an inverted trapezoidal shape having an open upper end. That is, a groove upper end of the groove 12 has a width larger than that of a groove lower end, and a value of a recorded reproduction signal is set to a value which satisfies CD specifications. On the other hand, the land 13 formed between the grooves 12, 12 formed adjacent to each other has a trapezoidal shape formed by inverting the shape of the groove 12.

Moreover, in the same manner as in the CD-R 100 described above with reference to FIGS. 1A to 1C, the groove 12 is wobbled as a guide track for additionally recording the information in a sinusoidal wave form on left and right sides of the groove by a wobble signal which has a center frequency of about 22 KHz. Moreover, an absolute time in pregroove (ATIP) signal is superimposed as recording position information indicating a recording position of the information signal upon the wobble signal, and thereby the recording position information is recorded beforehand in the groove 12. Concretely, FM modulation is applied about ±1 KHz centering on the wobble signal center frequency of about 22 KHz to superimpose the ATIP signal.

It is to be noted that, as omitted from the drawing, in the optical recording medium of the first embodiment, to mold the disc-shaped transparent resin substrate, the wobbled grooves and the land between the grooves may also be formed at a predetermined pitch in a concentric shape.

Furthermore, as omitted from the drawing, when the optical recording medium of the first embodiment is formed in a rectangular shape, the wobbled grooves and the land between the grooves can also be formed linearly at the predetermined pitch, or formed in a spiral or concentric shape in the rectangular shape.

Here, the optical recording medium 10A of the first embodiment is different from the CD-R 100 (FIGS. 1A to 1C) in that a recording film is not formed, and a metal reflective film 14 of aluminum, silver, or gold, and a protective film 15 by a UV curable resin are successively formed on the wobbled groove 12 and on the land 13 between the grooves 12, 12 formed adjacent to each other.

Moreover, as described later, the heat of the laser beam is used to melt the metal reflective film 14 so that the information signal can additionally be recorded only once. Here, since the groove 12 and land 13 are formed over the whole surface of the transparent resin substrate 11, the whole surface of the transparent resin substrate 11 is an additionally recordable region.

It is to be noted that the protective film 15 to be formed on the metal reflective film 14 may be formed by coating the metal reflective film 14 with the UV curable resin immediately after sputtering the film, or by melting the metal reflective film 14 by the heat of the laser beam as described later to additionally record the information signal and thereafter coating the film with the UV curable resin in the spin coat method.

Next, an optical recording medium drive to which the optical recording medium 10A can be applied will be described with reference to FIG. 5, before description of an operation for additionally recording the information signal on the optical recording medium 10A formed as described above according to the first embodiment.

Figure 5:
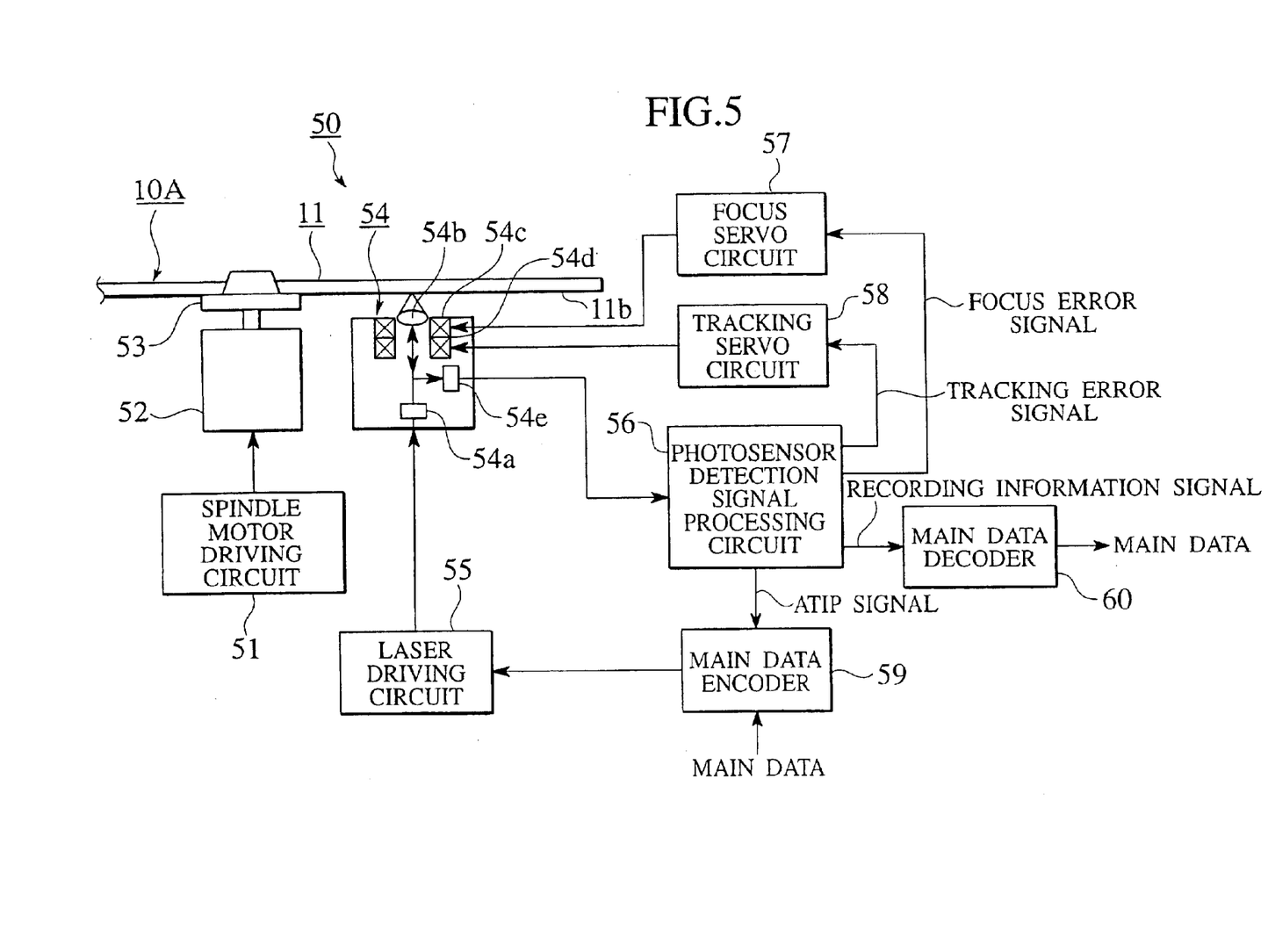
FIG. 5 is a block diagram showing an optical recording medium drive to which the optical recording medium according to the first embodiment of the present invention can be applied.

FIG. 5 is a block diagram showing the optical recording medium drive to which the optical recording medium according to the first embodiment of the present invention can be applied.

As shown in FIG. 5, in an optical recording medium drive 50 to which the optical recording medium 10A according to the first embodiment of the present invention can be applied, a spindle motor 52 is disposed to rotate the optical recording medium 10A at a constant linear velocity (CLV) by a spindle motor driving circuit 51. A turntable 53 is fixed to the shaft of the spindle motor 52, and the optical recording medium 10A of the first embodiment is attached onto the turntable 53 so that the medium can rotate integrally with the turntable 53.

Moreover, on an another surface 11b side of the transparent resin substrate 11 of the optical recording medium 10A, an optical pickup 54 is attached onto a pickup support base (not shown) so that the pickup can move in a diametric direction of the optical recording medium 10A.

The optical pickup 54 includes: a semiconductor laser 54a for emitting the laser beam; an objective lens 54b for irradiating the other surface 11b of the transparent resin substrate 11 with the laser beam which is emitted from the semiconductor laser 54a, passed through a collimator lens and beam splitter (not shown), and focused; a focus coil 54c for focus-controlling the objective lens 54b; a tracking coil 54d for tracking-controlling the objective lens 54b; and a four-divisions type photosensor 54e for detecting a return light of the laser beam reflected by the metal reflective film 14 (FIG. 4C) formed on the transparent resin substrate 11. These components are disposed in the pickup.

Moreover, a laser driving circuit 55 is connected to the semiconductor laser 54a in the optical pickup 54, and selectively changes a laser power to be applied to the semiconductor laser 54a at a recording time onto the optical recording medium 10A and a reproduction time with respect to the optical recording medium 10A in response to a command from a controller (not shown).

In this case, to additionally record the information signal on the optical recording medium 10A, the laser driving circuit 55 outputs a laser power intense to such a degree that the metal reflective film 14 can be molten on a semiconductor laser 54a side. On the other hand, to reproduce the additionally recorded information signal on the optical recording medium 10A, the circuit outputs a laser power which is as weak as that at a CD-ROM or CD-R reproduction time on the semiconductor laser 54a side.

Moreover, at the recording or reproducing time with respect to the optical recording medium 10A, the four-divisions type photosensor 54e in the optical pickup 54 detects the return light of the laser beam reflected by the metal reflective film 14 (FIG. 4C) formed on the transparent resin substrate 11, and sends a detected photosensor detection signal to a photosensor detection signal processing circuit 56.

The photosensor detection signal processing circuit 56 uses a well-known radial push-pull method to appropriately subject four photosensor detection signals from the four-divisions type photosensor 54e in the optical pickup 54 to addition/subtraction processing. The circuit further executes detection processing of a focus error signal, tracking error signal detected from a wobble signal by the wobbled groove 12 (FIG. 4B), ATIP signal filtered and extracted from the wobble signal by the wobbled groove 12 (FIG. 4B), and recording information signal.

Moreover, the focus error signal detected/processed by the photosensor detection signal processing circuit 56 is sent to a focus servo circuit 57. Furthermore, a focus control signal generated based on the focus error signal in the focus servo circuit 57 is applied to the focus coil 54c in the optical pickup 54 to focus-control the objective lens 54b.

Furthermore, the tracking error signal detected/processed by the photosensor detection signal processing circuit 56 is sent to a tracking servo circuit 58. Moreover, a tracking control signal generated based on the tracking error signal in the tracking servo circuit 58is applied to the tracking coil 54d in the optical pickup 54 to tracking-control the objective lens 54b.

Additionally, the ATIP signal detected/processed by the photosensor detection signal processing circuit 56 is sent to a main data encoder 59 of a recording system. Moreover, in the main data encoder 59, while the ATIP signal indicating the recording position information on the groove 12 (FIG. 4A) is referred to, main data inputted corresponding to the ATIP signal is EFM-modulated so as to be suitable for recording. The EFM-modulated main data is supplied to the laser driving circuit 55, and the laser driving circuit 55 applies a laser driving current to the semiconductor laser 54a in the optical pickup 54 based on the laser power at the recording time.

Moreover, the recording information signal detected/processed by the photosensor detection signal processing circuit 56 is sent to a main data decoder 60 of a reproduction system. Furthermore, in the main data decoder 60, the recording information signal is demodulated and the main data is outputted to the outside.

Next, the recording method of additionally recording the information signal on the optical recording medium 10A according to the first embodiment of the present invention will be described in detail with reference to FIGS. 6, 7A, and 7B.

Figure 6:
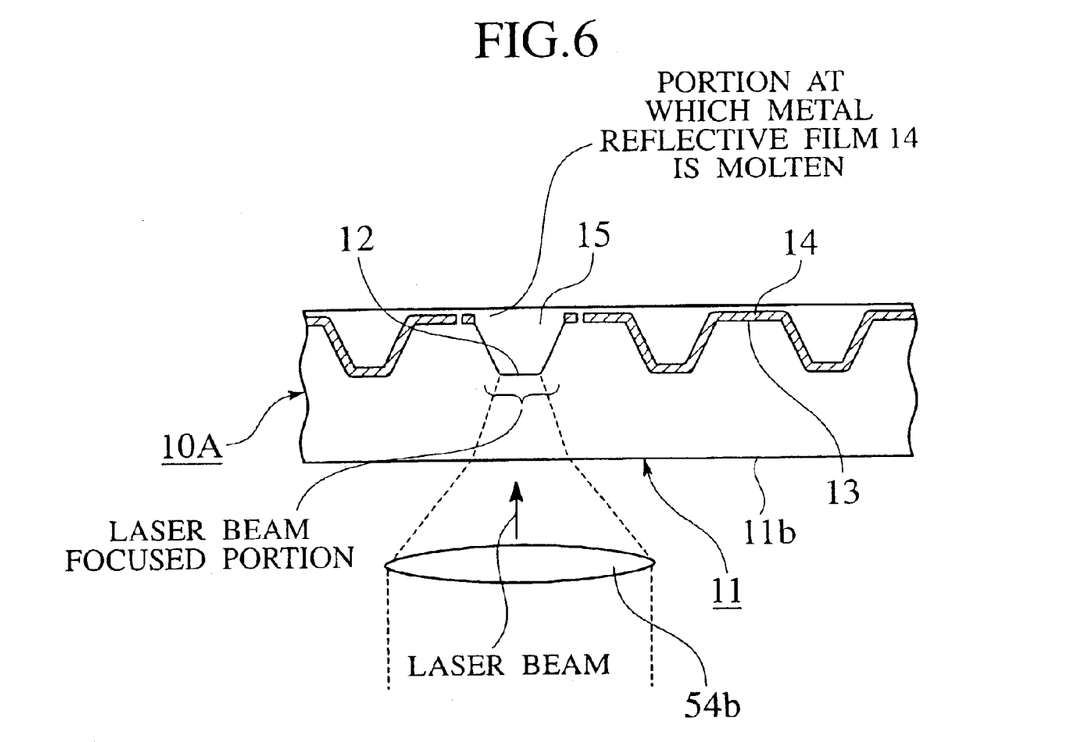
FIG. 6 is a longitudinal sectional view showing that an information signal is additionally recorded on the optical recording medium according to the first embodiment of the present invention.

FIG. 6 is a longitudinal sectional view showing that the information signal is additionally recorded on the optical recording medium according to the first embodiment of the present invention.

Figure 7A:
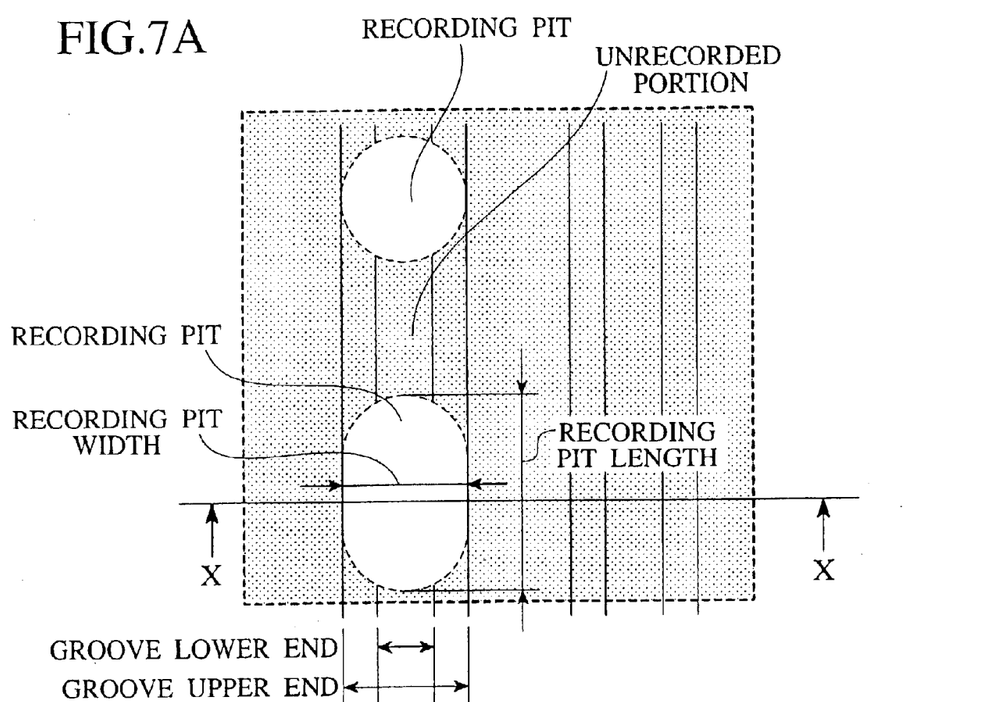
FIGS. 7A and 7B are a plan view and X—X longitudinal sectional view showing a state after the information signal is additionally recorded on the optical recording medium according to the first embodiment of the present invention.
Figure 7B:
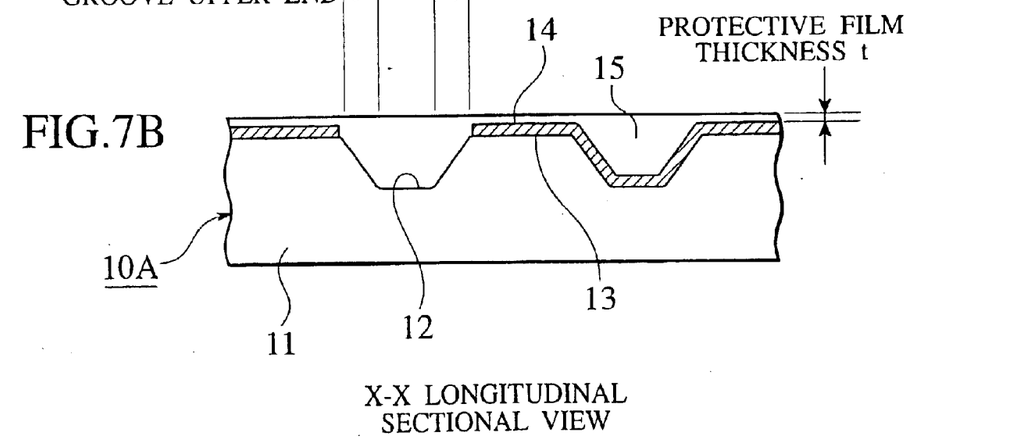

FIGS. 7A and 7B are a plan view and X—X longitudinal sectional view showing a state after the information signal is additionally recorded on the optical recording medium according to the first embodiment of the present invention.

The recording method of additionally recording the information signal on the optical recording medium 10A according to the first embodiment of the present invention is heat deformation recording of the metal reflective film 14 (FIG. 4C) by the heat of the laser beam.

Here, reflectance of the metal reflective film of aluminum for general use in the reflective film of the CD-ROM is about 80% which satisfies 70% or more of disk specifications, assuming that an incident light amount is 100% in a wavelength of 780 nm of the laser beam for exclusive use in reproduction. In this case, the remaining 20% of the incident light of the laser beam for exclusive use in reproduction forms a transmitted light and absorbed light, and each light occupies about 10%. In general, the laser power of the laser beam for exclusive use in reproduction is about 0.7 mW, the light amount absorbed by the metal reflective film of aluminum is 0.07 mW, and the metal reflective film of aluminum does not change at all.

However, assuming that the laser power of the laser beam is, for example, about 90 mW at the recording time onto the optical recording medium 10A according to the first embodiment of the present invention, the absorbed light amount of 9 mW is converted to the heat energy. For example, when the metal reflective film 14 (FIG. 4C) is formed of aluminum, an aluminum melting point of 660° C. is exceeded, and about 1000° C. is reached. This has been clarified by simulation (additionally, recording conditions are NA=0.6 of the objective lens, and pulse recording having 0.5T width by a laser recording light). As a result, it has been found that it is possible to melt the metal reflective film 14 (FIG. 4C) of aluminum and to make a hole in the metal reflective film 14.

That is, as shown in FIG. 6, when the information signal is additionally recorded on the optical recording medium 10A of the first embodiment, the objective lens 54b in the optical pickup 54 (FIG. 5) is disposed opposite to the other surface 11b of the transparent resin substrate 11. Moreover, for example, a laser beam of 90 mW is emitted as the laser power at the recording time from the semiconductor laser 54a (FIG. 5) in the optical pickup 54 (FIG. 5) on the objective lens 54b side. The laser beam of 90 mW focused by the objective lens 54b is emitted toward one groove 12 which is formed on the transparent resin substrate 11 and which has an unrecorded state. Here, when the laser beam of 90 mW is focused on one groove 12 having the unrecorded state in a spot shape by the objective lens 54b, the metal reflective film 14 of aluminum formed on one groove 12 in the unrecorded state absorbs the heat energy of the laser beam of 90 mW. Since the melting point of 660° C. of aluminum is exceeded, the film is molten. At the melting time, the metal reflective film 14 of aluminum, which is a thin film, is agglomerated around a spot portion by surface tension. Subsequently, after the laser beam passes, the film coagulates. Therefore, the metal reflective film 14 of aluminum of the spot portion disappears as shown.

A concrete method comprises: rotating the optical recording medium 10A at the constant linear velocity (CLV) by the spindle motor driving circuit 51; and detecting four photosensor detection signals from the four-divisions type photosensor 54e in the optical pickup 54 by the photosensor detection signal processing circuit 56. The method further comprises: detecting the tracking error signal and ATIP signal from the wobble signal by one wobbled groove 12 in the unrecorded state by the photosensor detection signal processing circuit 56; and irradiating the metal reflective film 14 formed on the groove 12 with the laser beam of 90 mW in the form of an EFM signal in accordance with the recording position information by the ATIP signal. The information signal can additionally be recorded only once at the recording position on the groove 12 according to the ATIP signal.

In this case, heat conductivity of the metal reflective film 14 of aluminum in the optical recording medium 10A of the first embodiment differs with respect to the recording film 104 of an organic dyestuff of the CD-R 100 (FIG. 1A). Therefore, needless to say, it is necessary to optimize write strategy (recording condition) of the laser beam to be recorded.

Moreover, by the recording method onto the optical recording medium according to the present invention, the information signal is additionally recorded on the optical recording medium 10A as shown in FIGS. 7A and 7B.

It is to be noted that FIG. 7A linearly shows the wobbled groove 12 in an enlarged size.

As shown in FIGS. 7A and 7B, for a recording pit additionally recorded on one wobbled groove 12 in the unrecorded state, the metal reflective film 14 of aluminum is molten in a circular or elliptical shape according to the information signal to be recorded. The width and length of the recording pit are shown, but the heat energy of the laser beam to be recorded has a property that the energy is intense toward the center of focus, and is attenuated when spreading over the periphery. Therefore, FIG. 7A is only a schematic representation. In actual, it is enough to perform the thermal recording so as to generate the reproduction signal by the laser beam for the reproduction at a predetermined level and time interval. Moreover, for the unrecorded portion, needless to say, the metal reflective film 14 of aluminum remains as such in the same manner as in the land 13 between the grooves (tracks).

Moreover, in the first embodiment, various information such as video information, sound information, and computer data can additionally be recorded only once over the grooves 12 of the whole surface of the transparent resin substrate 11, and of course the ID information unique to each medium can additionally be recorded only once. Therefore, the optical recording medium 10A is essential for a purpose of recording important data which must not be permitted to be rewritten by alternation.

In this case, when thickness t of the protective film 15 is about five microns like as the CD-ROM or CD-R, the hole is made in the protective film 15 by the heat of the laser beam at the recording time, and the function of the protective film 15 is not fulfilled. Therefore, when the protective film 15 is formed in the thickness t of 20 microns or more from the surface of the land 13, the hole is not made in the protective film 15 against the heat of the laser beam at the recording time. This has been found by experiment. Thereby, the metal reflective film 14 of aluminum is not oxidized, and the protective film 15 which is also satisfactory in appearance can be obtained.

Therefore, the recorded optical recording medium 10A satisfies the CD specifications, and can be played even with a well-known CD-ROM drive.

It is to be noted that the additional recording of the information signal in the groove 12 wobbled for compatibility with the CD specifications has been described in the first embodiment. However, it is also possible to additionally record the information signal on the land 13 between the grooves 12, 12 by the same recording method as described above. In this case, to additionally record the information signal on the land 13, land pre-pits are formed (=recorded) as the recording position information indicating the recording position with respect to the information signal at each predetermined interval on the land 13 beforehand. A land pre-pit signal (recording position information signal) by the land pre-pits is detected by the photosensor detection signal processing circuit 56 (FIG. 5) and notified to the main data encoder 59 so that the additional recording is possible.

Furthermore, instead of superimposition of the ATIP signal indicating the recording position upon the wobbled groove 12, a method of using the land pre-pits formed beforehand at the predetermined intervals on the land 13 as the recording position information with respect to the information signal on the groove 12 is also possible. In this case, in the same manner as described above, the method is possible, when the land pre-pit signal (recording position information signal) by the land pre-pits is detected by the photosensor detection signal processing circuit 56 (FIG. 5) and notified to the main data encoder 59.

Therefore, the recording position information indicating the recording position of the information signal is recorded beforehand on the groove 12 and/or the land 13, while the information signal can additionally be recorded on the groove 12 and/or the land 13.

Moreover, in the first embodiment, the method of obtaining the predetermined signal which satisfies the CD specifications has mainly be described. However, the specifications of CD determine only the level of the reproduction signal of the optical disk, and do not define the physical structure. Therefore, any mechanism for generating the signal may obviously be used, as long as the signal satisfying the CD specifications is obtained.

Therefore, it can easily be judged by analogy that the signal specifying the CD specifications can be obtained by chemically changing the metal reflective film 14 of aluminum to change the reflectance by the heat generated by the laser beam or by deforming the transparent resin substrate 11 by the heat of the laser beam to change the shape of the groove 12 and/or the land 13 or by a composite factor of these changes.

<Second Embodiment>

Figure 8A:
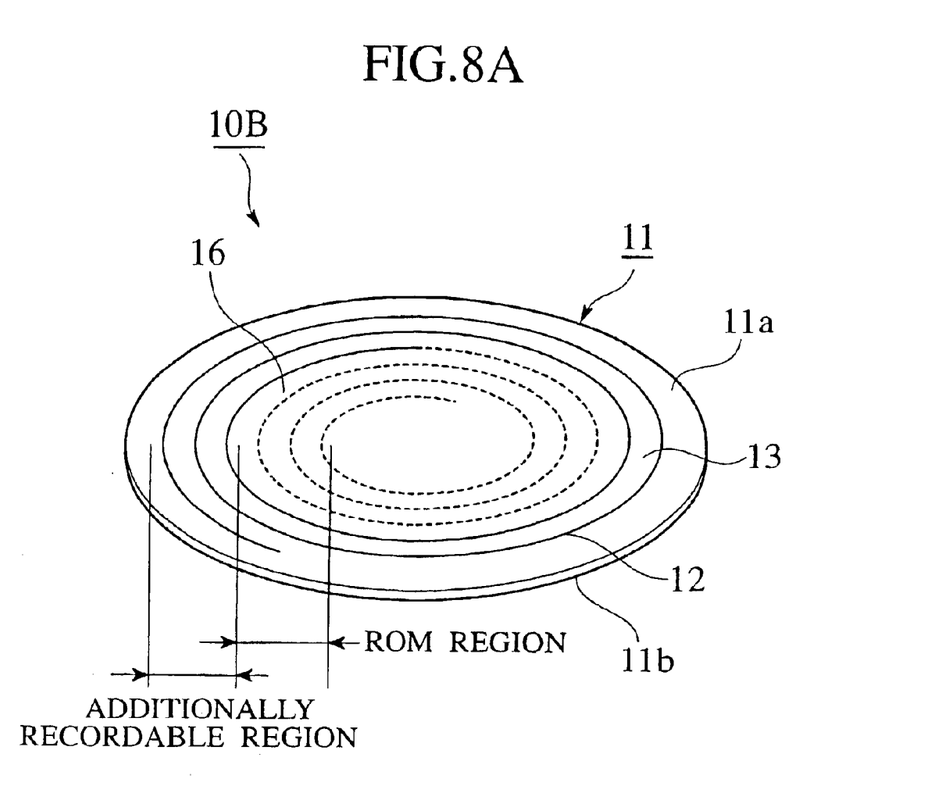
FIG. 8A is an appearance perspective view.
Figure 8B:
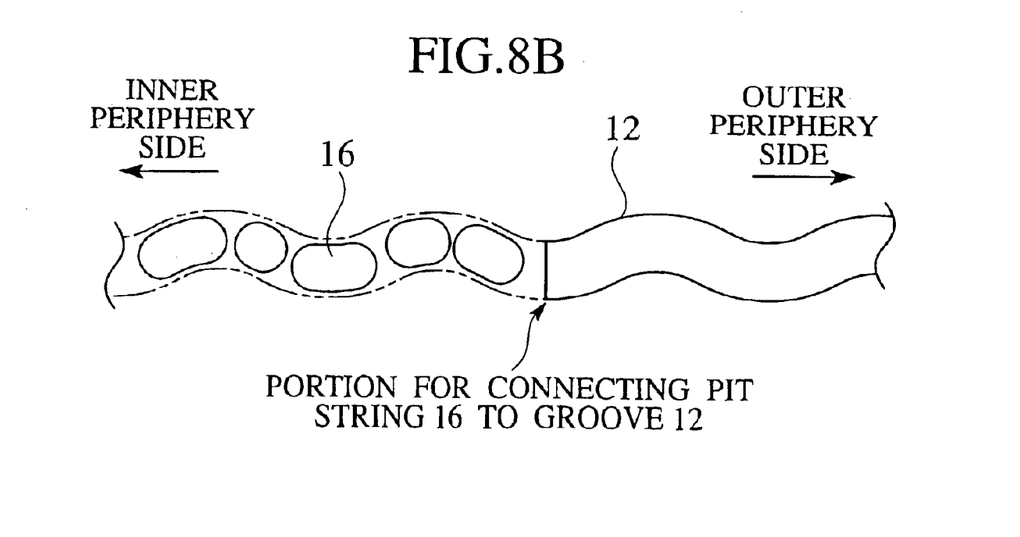
FIG. 8B is an enlarged view of a portion at which a pit string is connected to an unrecorded groove.

FIGS. 8A and 8B are explanatory views of the optical recording medium according to a second embodiment of the present invention, FIG. 8A is an appearance perspective view, and FIG. 8B is an enlarged view of a portion at which the pit string is connected to the unrecorded groove.

An optical recording medium 10B shown in FIG. 8A according to the second embodiment of the present invention has a constitution similar to that of the optical recording medium 10A of the first embodiment except a part of the constitution. Here, for the sake of convenience in description, portions having the same shapes as those of the above-described structure are denoted with the same reference numerals, and portions having different shapes are denoted and described with new reference numerals.

As shown in FIG. 8A, in the optical recording medium 10B according to the second embodiment of the present invention, a pit string 16 including a plurality of pits is carved beforehand in a spiral shape to a middle periphery side from an inner periphery side on one surface 11a of the transparent resin substrate 11.

Moreover, the wobbled groove 12 is formed beforehand in the spiral shape to an outer periphery side from the middle periphery side on one surface 11a of the transparent resin substrate 11, and the land 13 is formed beforehand between the adjacent grooves 12, 12. In this case, for the wobbled groove 12, in the same manner as in the first embodiment, the ATIP signal (recording position information signal) is FM-modulated and superimposed upon the wobble signal.

It is to be noted that to additionally record the information signal on the land 13 even in the second embodiment, the land pre-pit may be formed (=recorded) as the recording position information indicating the recording position with respect to the information signal at each predetermined interval on the land 13.

Moreover, as shown in FIG. 8B in the enlarged size, at a portion for connecting the pit string 16 to the groove 12, when at least part of the pit string 16 near the connecting portion is wobbled, the tracking into the groove 12 is not disturbed. It is to be noted that when the whole pit string 16 are wobbled, tracking control is easily executed in the same manner as in the groove 12.

Furthermore, as omitted from the drawing, the metal reflective film 14 of aluminum, silver, or gold, and the protective film 15 by the UV curable resin are successively formed on the pit string 16, wobbled groove 12, and the land 13 between the adjacent grooves 12, 12 formed on one surface 11a of the transparent resin substrate 11.

Additionally, the pit string 16 on which the metal reflective film 14 is formed includes a plurality of pits into which the information signal is converted, and therefore constitutes a ROM region. On the other hand, the groove 12 and/or the land 13 on which the metal reflective film 14 is formed are in the unrecorded state, and therefore constitute an additionally recordable region.

It is to be noted that, as shown in FIG. 8A, in the optical recording medium 10B of the second embodiment, the ROM region by the pit string 16 is set on the inner periphery side, and the additionally recordable region by the groove 12 and/or the land 13 is set on the outer periphery side. However, the present invention is not limited to this constitution. It is easy to form the ROM region by the substantially whole surface and dispose the additionally recordable region in a part of the surface. It is possible to additionally record the ID information such as a continuous serial number by which each medium can be identified on the additionally recordable region.

In this constitution, the ROM region by the pit string 16 is manufactured by injection molding from the stamper in the same manner as in the conventional CD-ROM, and later the individual ID information for each medium is additionally recorded on the additionally recordable region by the groove 12 and/or the land 13, for example, with a CD-R writer. Thereby, it is possible to provide the optical recording medium 10B of the second embodiment which can achieve both objects of the present invention including mass productivity and individual information recording.

Moreover, the serial number to be additionally recorded on the additionally recordable region by the groove 12 and/or the land 13 is a security signal which cannot be read in a conventional method. Thereby, it is also possible to provide a disc to which a new security ID is attached.

Furthermore, to additionally record the information signal on the additionally recordable region, when the above-described ATIP signal (or the land pre-pit signal) is detected, and thereby the tracking signal, and time information indicating the position are obtained, the additional recording is possible as described above.

Also, as shown in FIG. 8A, with the mixed presence of the ROM region by the pit string 16 and the additionally recordable region by the groove 12 and/or the land 13, the additional recording onto the additionally recordable region is considered.

In this case, it is obvious that the ATIP information (or the land pre-pit signal) recorded on the additionally recordable region had better be obtained from the ROM region before entering the additionally recordable region in order to record the signal from the tip end of the additionally recordable region. Therefore, in order to obtain the ATIP signal (or the land pre-pit signal) from the ROM region, it is essential to wobble and record at least part of the ROM region connected to the additionally recordable region.

It is to be noted that the first and second embodiments have been described in conformity with the CD specifications using the transparent resin substrate having a thickness of 1.2 mm. However, the present invention is not limited to this constitution. The technical idea of the present invention can also be applied to DVD specifications in which two transparent resin substrates each having a thickness of 0.6 mm are bonded to each other, and next-generation optical disk having an extra-high density which is expected to be practically used in the future.

As described above, according to the optical recording medium of the first embodiment of the present invention, the recording position information signal corresponding to the recording position information indicating the recording position of the information signal is detected from the optical recording medium. At this time, the information signal can additionally be recorded on the recording position according to the recording position information signal and in the metal reflective film formed on the groove and land. Additionally, the additionally recordable optical recording medium has a simple structure and good productivity.

Moreover, according to the optical recording medium of the second embodiment of the present invention, the ROM region by the pit string and the additionally recordable region by the groove and/or the land are disposed in a mixed manner on the transparent resin substrate. Therefore, it is possible to provide the optical recording medium which can establish both the mass productivity and individual information recording.

Furthermore, in the recording method onto the optical recording medium, the information signal is additionally recorded on the optical recording medium according to the first and second embodiments. The method comprises: detecting the recording position information signal corresponding to the recording position information from the optical recording medium; and melting the metal reflective film formed on the groove and/or the land, changing the reflectance of the metal reflective film, or changing the shape of the groove and/or the land by the heat of the laser beam to additionally record the information signal at the recording position corresponding to the recording position information signal. Therefore, the recording position does not deviate while the information signal can additionally be recorded on the optical recording medium.

It should be understood that many modifications and adaptations of the invention will become apparent to those skilled in the art and it is intended to encompass such obvious modifications and changes in the scope of the claims appended hereto.

What is claimed is:

1. An optical recording medium comprising: a transparent resin substrate on which a groove and a land between the grooves adjacent to each other are formed beforehand,
    wherein recording position information indicating a recording position of an information signal is recorded beforehand on at least one of the groove and land, and a metal reflective film and protective film are successively formed on the groove and land.

2. A recording method onto an optical recording medium, for additionally recording an information signal on the optical recording medium according to claim 1, the method comprising the steps of:
    detecting a recording position information signal corresponding to recording position information from the optical recording medium;
    melting a metal reflective film formed on at least one of a groove and land by heat of a laser beam; and
    additionally recording the information signal at a recording position corresponding to the recording position information signal.

3. A recording method onto an optical recording medium, for additionally recording an information signal on the optical recording medium according to claim 1, the method comprising the steps of:
    detecting a recording position information signal corresponding to recording position information from the optical recording medium;
    changing reflectance of a metal reflective film formed on at least one of a groove and land by heat of a laser beam; and
    additionally recording the information signal at a recording position corresponding to the recording position information signal.

4. A recording method onto an optical recording medium, for additionally recording an information signal on the optical recording medium according to claim 1, the method comprising the steps of:
    detecting a recording position information signal corresponding to recording position information from the optical recording medium;
    changing a shape of at least one of a groove and land by heat of a laser beam; and
    additionally recording the information signal at a recording position corresponding to the recording position information signal.

5. An optical recording medium comprising: a transparent resin substrate on which a pit string including a plurality of pits, a groove, and a land between the grooves adjacent to each other are formed beforehand,
    wherein recording position information indicating a recording position of an information signal is recorded beforehand on at least one of the groove and land, and a metal reflective film and protective film are successively formed on the pit string, groove, and land.

6. A recording method onto an optical recording medium, for additionally recording an information signal on the optical recording medium according to claim 5, the method comprising the steps of:
    detecting a recording position information signal corresponding to recording position information from the optical recording medium;
    melting a metal reflective film formed on at least one of a groove and land by heat of a laser beam; and
    additionally recording the information signal at a recording position corresponding to the recording position information signal.

7. A recording method onto an optical recording medium, for additionally recording an information signal on the optical recording medium according to claim 5, the method comprising the steps of:
    detecting a recording position information signal corresponding to recording position information from the optical recording medium;

changing reflectance of a metal reflective film formed on at least one of a groove and land by heat of a laser beam; and additionally recording the information signal at a recording position corresponding to the recording position information signal.

8. A recording method onto an optical recording medium, for additionally recording an information signal on the optical recording medium according to claim 5, the method comprising the steps of:

detecting a recording position information signal corresponding to recording position information from the optical recording medium;

changing a shape of at least one of a groove and land by heat of a laser beam; and additionally recording the information signal at a recording position corresponding to the recording position information signal.

* * * * *